United States Patent
Gallego et al.

(10) Patent No.: US 9,533,434 B2
(45) Date of Patent: Jan. 3, 2017

(54) MOLD FOR FLAT RUBBER TREADS

(71) Applicant: MICHELIN RECHERCHE ET TECHNIQUE S.A., Granges-Paccot (CH)

(72) Inventors: Juan-Pablo Gallego, Simpsonville, SC (US); Metodi L. Ikonomov, Clermont-Ferrand (FR); Carl R. Driver, Mauldin, SC (US)

(73) Assignees: Compagnie Generate Des Etablissements Michelin, Paris (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 15/004,366

(22) Filed: Jan. 22, 2016

(65) Prior Publication Data

US 2016/0136848 A1    May 19, 2016

Related U.S. Application Data

(60) Division of application No. 14/623,231, filed on Feb. 16, 2015, now Pat. No. 9,272,476, which is a division
(Continued)

(51) Int. Cl.
*B29C 33/42* (2006.01)
*B29C 33/44* (2006.01)
(Continued)

(52) U.S. Cl.
CPC ............ *B29C 33/42* (2013.01); *B29C 33/442* (2013.01); *B29C 37/0014* (2013.01);
(Continued)

(58) Field of Classification Search
CPC ...... B29C 33/0055; B29C 33/42; B29C 33/44; B29C 35/02; B29D 30/0606; B29D 30/52
See application file for complete search history.

(56) References Cited

U.S. PATENT DOCUMENTS

| 1,784,780 A | 12/1930 | Bronson |
| 2,608,498 A | 8/1952 | Kennedy |

(Continued)

FOREIGN PATENT DOCUMENTS

| DE | 286541 A5 | 1/1991 |
| EP | 0583600 A1 | 2/1994 |

(Continued)

OTHER PUBLICATIONS

PCT/US2006/043345 International Search Report and Written Opinion dated Apr. 18, 2007, 4 pages.
(Continued)

*Primary Examiner* — James Mackey
(74) *Attorney, Agent, or Firm* — Hahn Loeser & Parks LLP; Bret A. Hrivnak

(57) ABSTRACT

Embodiments of the invention include a mold for forming a tire tread. The mold includes a tongue forming portion at an end of a tread forming portion. The tongue forming portion has a substantially constant thickness, except for a portion at an end of the tongue forming portion having a thickness greater than a thickness of a remainder of the tongue forming portion.

6 Claims, 3 Drawing Sheets

Related U.S. Application Data of application No. 13/674,589, filed on Nov. 12, 2012, now Pat. No. 8,986,592, which is a continuation of application No. 12/440,969, filed as application No. PCT/US2006/043345 on Nov. 8, 2006, now Pat. No. 8,377,363.

(51) Int. Cl.
| | |
|---|---|
| B29C 37/00 | (2006.01) |
| B29D 30/00 | (2006.01) |
| B29D 30/54 | (2006.01) |
| B29C 43/50 | (2006.01) |
| B29D 30/06 | (2006.01) |
| B29C 33/00 | (2006.01) |
| B29D 30/52 | (2006.01) |
| B29L 30/00 | (2006.01) |

(52) U.S. Cl.
CPC ..... *B29D 30/0061* (2013.01); *B29D 30/0603* (2013.01); *B29D 30/0681* (2013.01); *B29D 30/54* (2013.01); *B29C 33/0055* (2013.01); *B29C 33/44* (2013.01); *B29C 2043/5061* (2013.01); *B29C 2043/5069* (2013.01); *B29D 30/0606* (2013.01); *B29D 30/52* (2013.01); *B29L 2030/002* (2013.01)

(56) References Cited

U.S. PATENT DOCUMENTS

| | | | |
|---|---|---|---|
| 2,843,896 A | | 7/1958 | Rinella |
| 3,829,271 A | * | 8/1974 | Taylor .................... B29D 30/52 425/157 |
| 4,076,483 A | | 2/1978 | Smirne |
| 4,247,093 A | | 1/1981 | Kistner et al. |
| 4,371,476 A | | 2/1983 | Newkirk et al. |
| 4,818,203 A | * | 4/1989 | Majerus .............. B29C 45/0003 156/125 |
| 5,066,448 A | | 11/1991 | Chlebina et al. |
| 5,346,387 A | | 9/1994 | Muller et al. |
| 5,738,813 A | | 4/1998 | Naganawa et al. |
| 5,895,621 A | | 4/1999 | Tajiri et al. |
| 5,919,290 A | | 7/1999 | Ishikawa et al. |
| 6,638,049 B1 | | 10/2003 | Moss et al. |
| 6,685,867 B2 | | 2/2004 | Wellman et al. |
| 6,991,208 B1 | | 1/2006 | Herman |
| 7,153,458 B2 | | 12/2006 | Ide et al. |
| 7,186,103 B2 | * | 3/2007 | Menard .................. B29C 33/44 425/28.1 |
| 7,234,927 B2 | | 6/2007 | Ebiko et al. |
| 2004/0197432 A1 | | 10/2004 | Menard |
| 2007/0092594 A1 | | 4/2007 | Ho et al. |
| 2011/0101568 A1 | | 5/2011 | Gallego et al. |
| 2011/0148001 A1 | * | 6/2011 | Cress .................. B29C 33/0055 264/334 |
| 2012/0146262 A1 | | 6/2012 | Adams et al. |

FOREIGN PATENT DOCUMENTS

| | | | |
|---|---|---|---|
| EP | 1306182 | A2 | 5/2003 |
| JP | S6089313 | A | 5/1985 |
| JP | 03116907 | U1 | 12/1991 |
| JP | 4135726 | A | 5/1992 |
| JP | H05104534 | A | 4/1993 |
| JP | 5-111921 | * | 5/1993 |
| JP | 6020021 | A | 1/1994 |
| JP | 06023868 | A | 2/1994 |
| JP | 8-238624 | * | 9/1996 |
| JP | 8238624 | A | 9/1996 |
| JP | 2002120301 | A | 4/2002 |
| JP | 2004537439 | A | 12/2004 |
| JP | 2005007713 | A | 1/2005 |
| JP | 2007081048 | A | 3/2007 |
| JP | 2011143655 | A | 7/2011 |
| WO | 03/013819 | A1 | 2/2003 |

OTHER PUBLICATIONS

EP06837065 Supplementary European Search Report dated Apr. 26, 2010, 5 pages.

\* cited by examiner

US 9,533,434 B2

MOLD FOR FLAT RUBBER TREADS

This application is a divisional application claiming priority to, and the benefit of, U.S. patent application Ser. No. 14/623,231, filed Feb. 16, 2015 and now U.S. Pat. No. 9,272,476, which is a divisional of U.S. patent application Ser. No. 13/674,589, filed Nov. 12, 2012 and now U.S. Pat. No. 8,986,592, which is a continuation of U.S. patent application Ser. No. 12/440,969, filed Mar. 12, 2009 (but which was given a 371(c) filing date of Nov. 9, 2009) and now U.S. Pat. No. 8,377,363, which is a national stage entry of International Application No. PCT/US2006/043345, filed Nov. 8, 2006 with the United States Receiving Office, where the present application claims priority to, and the benefit of, all such applications and hereby incorporates by reference all such applications.

BACKGROUND OF THE INVENTION

Field of the Invention
The present invention is in the field of cured tire treads.
Description of the Related Art
When tires become worn, they can be restored with new tread. Large truck tires are typically retreaded as part of a routine tire-management program. The carcass of a truck tire is expected to last several hundred thousand miles and be amenable to having a new tread adhered to it several times. New truck tires are quite expensive and are therefore bought with the expectation that their high initial costs are offset by the long service life of the carcass and the low comparative cost of retreading.

A variety of procedures and different types of equipment are available for use in recapping or retreading pneumatic tires. One of the first steps in retreading a worn tire is to remove existing tread material from the tire carcass by a sanding procedure known as buffing. Next a layer of what is known as "cushion gum" is applied to the carcass. This layer of extruded, uncured rubber may be stitched or adhesively bonded to the carcass. Next, a tread layer, or tread band, is applied atop the layer of cushion gum. In the cold recapping process, the tread layer is cured rubber, and has a tread pattern already impressed in its outer surface. The tire is then placed in an autoclave, and heated under pressure for an appropriate time to induce curing of the gum layer, and binding of the gum layer to the inner or sole side of the tread layer and the carcass. The term "cure" refers to the formation of cross-links between the elastomer molecules in the rubber compound.

SUMMARY OF THE INVENTION

A particular embodiment of the present invention includes a method for automatically de-molding a cured tread, the method comprising: molding a tread band in a mold, the tread band comprising a tongue portion and a tread portion; positioning a tread anchoring member to a tongue-engaging position; automatically engaging the tongue portion in the mold with the tread anchoring member; and removing the tread from the mold.

Another particular embodiment of the present invention includes an automated device for removing a cured tread band from a mold, the device comprising: a first member comprising an anchoring member, the first member selectively moveable between a tread band engaging position, a tread band pinching position, and a tread band removal position; a second member selectively moveable to a second member tread band pinching position when the first member is in the first member tread band pinching position; the second member further selectively moveable with the first member to the tread band removal position while maintaining the second tread band pinching position with the first member.

Another particular embodiment of the present invention includes a mold for a tread, the mold comprising: a tongue forming portion at an end of a tread forming portion; the tongue forming portion having a substantially constant thickness, except for a portion at the end of the tongue forming portion having a thickness greater than a thickness of a remainder of the tongue forming portion.

These and other advantages will be apparent upon a review of the detailed description of the invention.

DETAILED DESCRIPTION OF THE DRAWINGS

Figure 1:
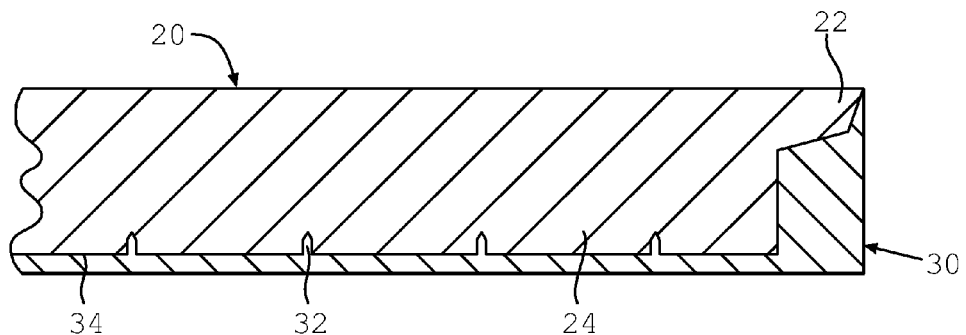
FIG. 1 shows the current extraction process showing a cross-sectional view of a cured tread in a mold ready for extraction.
Figure 2:
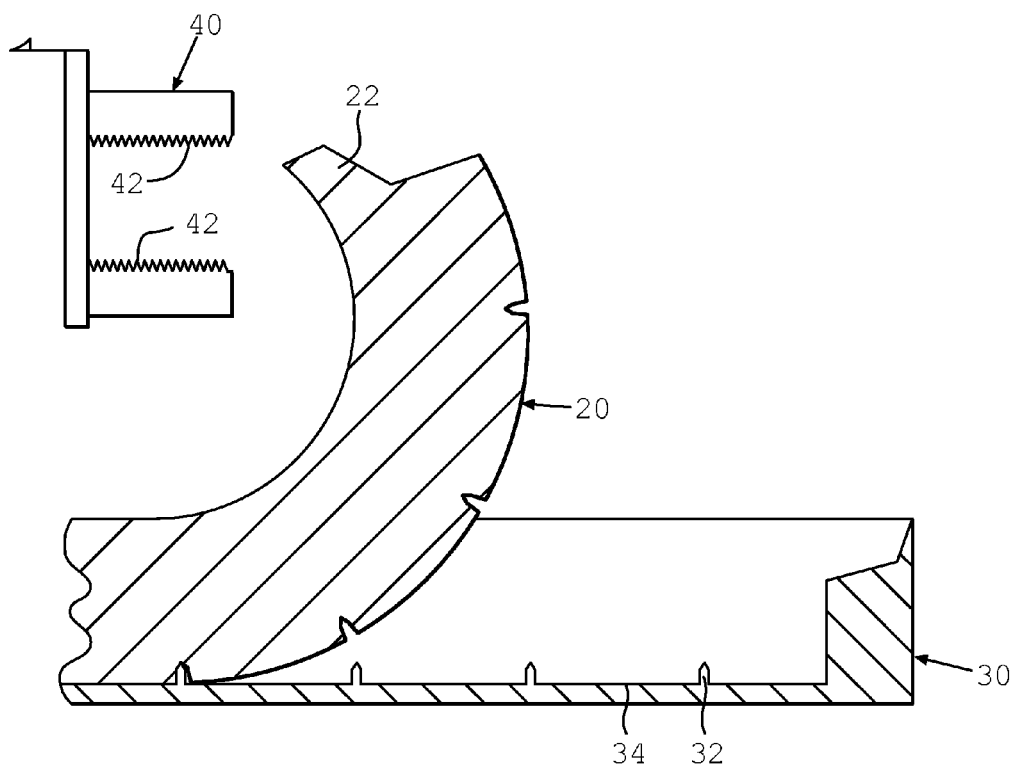
FIG. 2 shows the cured tread of FIG. 1 in the process of being manually extracted and loaded into a de-molding grip device.

Referring now to FIG. 1, a cured tread 20 is shown in a mold 30. The mold 30 includes a molding cavity. The cured tread 20 has a short tongue 22 formed at the end of the mold 30. The mold 30 has a plurality of projections 32 extending upward from the bottom 34 of the mold 30 to form the tread elements 24 of the cured tread 20. In the prior manufacturing process of the cured tread 20, an operator must manually pull the tongue 22 out of the mold 30 and into the jaws 42 of a mechanical de-molding grip 40 as best shown by FIG. 2. The pulling of the tongue 22 requires that at least a portion of the cured tread 20 be removed manually to enable the short tongue 22 to be loaded into the jaws 40 of the de-molding grip 42. This task requires great effort for some tread designs that, by their nature, may be well anchored in the mold 30.

Figure 3:
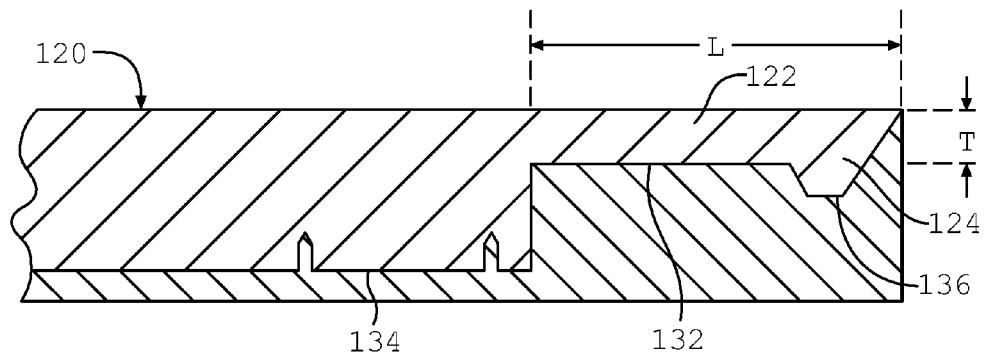
FIG. 3 shows a cross-sectional view of a mold in accordance with one embodiment of the present invention.

In one embodiment of the present invention as shown in FIGS. 3-6, the process has been automated to remove operator interaction. The mold 130 has been modified to include a longer tongue forming portion 132 adjacent the tread forming portion 134 as shown in FIG. 3 including the cured tread 120 and tongue 122 formed therein. As an example, in one embodiment, the tongue forming portion 132 is approximately 10-25 cm in length, L, 3-5 mm thick, T, and about half the width of the tread or more. The tongue 122 also is strong enough that it does not tear during extraction of the tread 120 from the mold 130. While the tongue forming portion 132 has a substantially constant thickness, however, in one embodiment, the end of the tongue forming portion 132 may also have an enlarged thickness (depth) portion 136. This creates a bulb or enlarged portion 124 with increased thickness at the end of the tongue 122, which will be discussed in greater detail below. While the embodiments described herein include a tongue forming portion and hence a tongue on the tread, the invention is not meant to be limited thereby and indeed, the invention is suitable for use with treads and molds having no tongue-forming portion as well as for use with tongue-forming portions that may not be as robust as those described in the particular embodiments herein.

Figure 4:
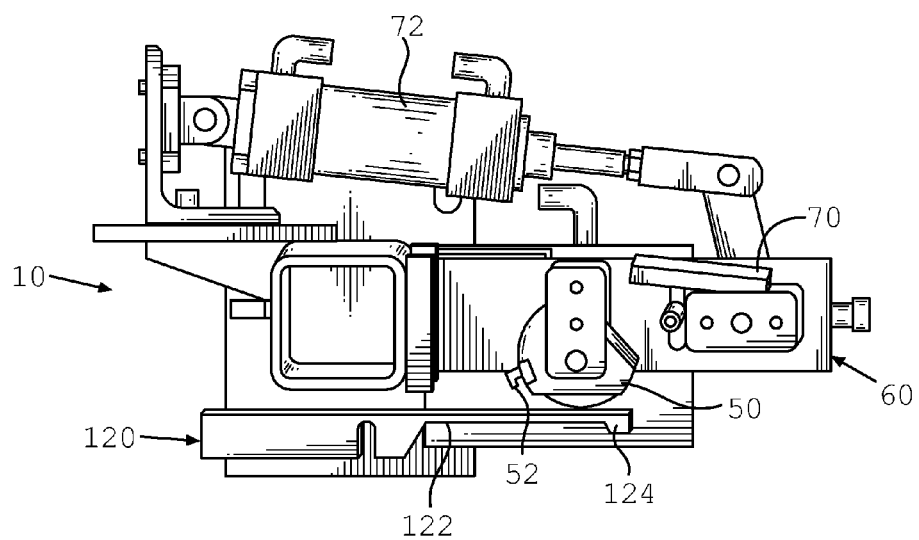
FIG. 4 shows an embodiment of an automatic de-molder positioned over a cured tread.
Figure 5:
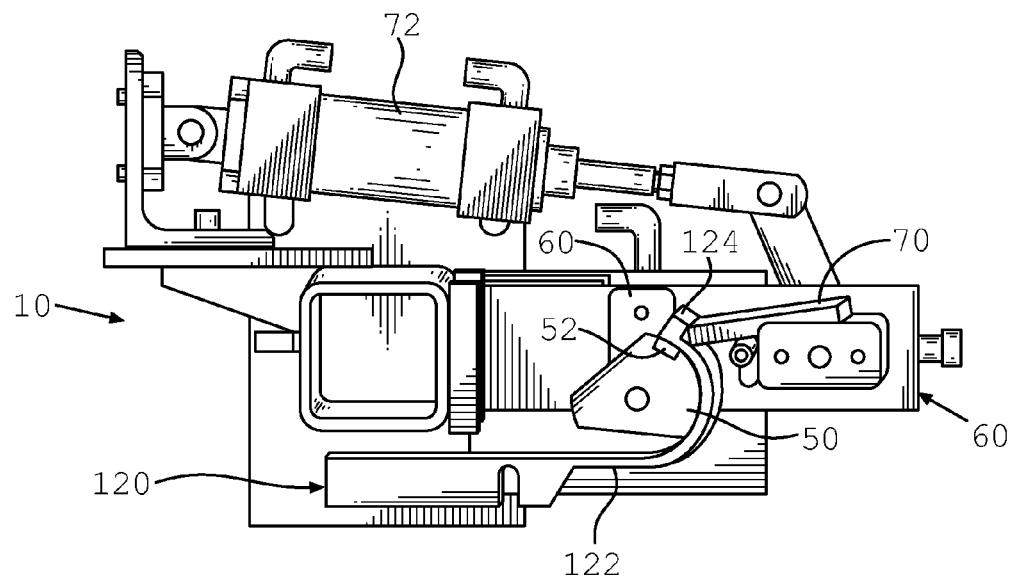
FIG. 5 shows the automatic de-molder of FIG. 4 with the tread automatically loaded onto the de-molder.
Figure 6:
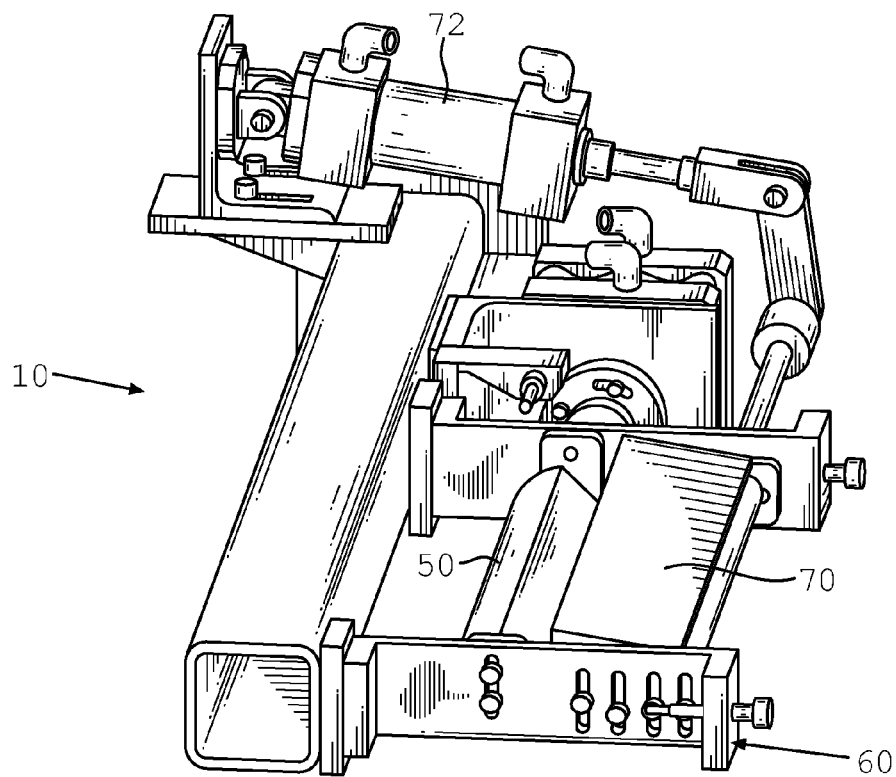
FIG. 6 shows a perspective view of the automatic de-molder of FIG. 4.

An embodiment of an automated de-molding device 10 is shown in FIGS. 4-6. The automated de-molding device 10 comprises a first member 50 having at least one anchoring member 52, shown herein as a plurality of hooks. The first member 50 is formed herein at least partially as a cylindrical drum that is selectively rotatable about its axis, the first member 50 being mounted on a carriage housing 60. It is noted that the first member is not limited to a particular geometry, such as a partial cylindrical drum, nor to a particular type of movement, such as rotation, and that these are provided as examples only. The automated de-molding device 10 further comprises a second member 70 formed herein at least in part as a plate that is selectively rotatable about an axis adjacent an end of the second member 70, the second member 70 being rotatably mounted on the carriage housing 60 and actuated by an actuator 72 shown herein as, but not limited to, a powered cylinder. The second member 70 is positionable adjacent the first member 50 (wherein the first member and the second member are gripping members) to secure and lock the tongue 122 of the cured tread 120 between the first member 50 and the second member 70 as discussed in detail below. It is noted that the second member is not limited to a particular geometry, such as a plate, nor to a particular type of movement, such as rotation, and that these are provided as examples only.

In operation, the method of one embodiment of the invention is described below. The tread 120 is molded in a mold 130 comprising tongue forming portion 132 at the end of the tread forming portion 134 The automated de-molding device 10 comprising first member 50 is positioned over the cured tread 120 such that the at least one anchoring member 52 is adjacent to the enlarged portion 124 of the tongue 122 of the cured tread 120 as best shown in FIG. 4. The first member 50 is rotated such that the at least one anchoring member 52 moves into the mold 130 (not shown in FIGS. 4 and 5 so that the tread is more clearly shown) and engages the tongue 122 of the cured tread 120. The rotation of the first member 50 continues to wind the tongue 122 about at least a portion of the first member 50. The cylinder 72 actuates the second member 70 to rotate and pinch a portion of the tongue 122, adjacent the enlarged portion 124, against the drum of the first member 50, securing the tongue 122 to the automated de-molding device 10 between the first member 50 and the second member 70. The second member 70 is held against the tongue 122 by the cylinder 72. In the next step, either the automated de-molding device 10 is moved on a movable carriage housing 60 toward the opposite end of the cured tread 120 to remove the cured tread 120 from the mold 130, or the opposite end of the cured tread 120 is moved toward the automated de-molding device 10 to remove the cured tread 120 from the mold 130, or combinations of such movements. It is noted that the end of the tread 120 is re-oriented nearly 180 degrees as the de-molding device moves with respect to the mold 130 to extract the remainder of the cured tread 120 from the mold 130; however, the invention is not limited to such an orientation, i.e. for example, the device 10 could move upward away from the mold 130 or the mold could move downward away from the device, or combinations thereof. Additionally, in one embodiment, it is contemplated that the step of moving the automated de-molding device 10 with respect to the mold 130 begins at least when the at least one anchoring member 52 engages the cured tread 120.

Referring still to FIGS. 4-6, the first member 50 selectively moveable, or rotatable as shown, between a tread band engaging position shown in FIG. 4 to a tread band pinching position shown in FIG. 5. The first member 50 is also moveable while in tread band pinching position with respect to the mold to a tread band removal position wherein the tread is removed from the mold. The second member 70 is selectively moveable, or rotatable as shown, between a tread disengaged position shown in FIG. 4 to the second member tread pinching position when the first member 50 is in the first member tread band pinching position, as shown in FIG. 5. The second member 70 further selectively moveable with the first member 50 to the tread band removal position while maintaining the second tread band pinching position with the first member 50. As shown in FIG. 5 the tread band pinching position juxtaposes the anchoring member 52 of the first member 50 with a pinching face of the second member 70 and wherein the distance separating the anchoring member 52 and the pinching face while in the tread band pinching position is sufficient to grip the tread band therebetween.

In operation, the method for automatically de-molding a cured tread of one embodiment of the invention is described below. The method comprises the steps of molding a tread band 120 in a mold 130, the tread band 120 comprising a tongue portion 122 and a tread portion; positioning a tread anchoring member 52 to a tongue-engaging position; automatically engaging the tongue portion 122 in the mold 130 with the tread anchoring member 52; and removing the tread 120 from the mold 130. The step of removing the tread 120 from the mold 130 comprises moving the mold 130 away from the anchoring member 52, moving the anchoring member 52 away from the mold 130, or combinations thereof. The step of engaging the tongue portion 122 further comprises pinching the tongue portion 122 between two gripping members 50, 70. The step of engaging the tongue portion may further comprise wrapping at least a part of the tongue portion 122 around at least one of the gripping members 50. The step of pinching the tongue portion between two gripping members 50, 70 may also comprise the step of pinching the tongue portion 122 of the tread 120 between the two gripping members 50, 70 by moving one of the gripping members 70 against the tongue portion 122. The step of molding the tread band 120 may further comprise the step of molding an enlarged tongue portion at a distal end of the tongue portion. In another embodiment, the method further comprises the step of positioning the anchoring member 52 adjacent to an end of the tongue 122 of the tread 120 prior to the step of engaging the tongue portion 122 of the tread 120 with an anchoring member 52 while the tongue portion 122 is still in the mold 130.

Although not shown, once the tread 120 has been removed from the mold 130, the second member 70 moves away from the tongue portion 122 of the tread 120. The first member 50 then rotates in a direction unwinding the tongue 122 and removing the anchoring members 52 from the tongue 122 of the tread 120. The device 10 then moves back to its original position to remove another tread from a mold 130, or another mold 130 is moved in position with respect to the device 10.

While this invention has been described with reference to preferred embodiments thereof, it shall be understood that such description is by way of illustration and not by way of limitation. Accordingly, the scope and content of the present invention are to be defined only by the terms of the appended claims.

We hereby claim the following:

1. A mold for a tread, the mold comprising:
   a single tongue forming portion arranged at an end of a tread forming portion that forms a tread band having a tread portion and a single tongue portion extending from the tread portion;
   the single tongue forming portion having a substantially constant thickness at least 3 millimeters (mm) thick, except for a portion at an end of the single tongue forming portion having a thickness greater than a thickness of a remainder of the single tongue forming portion.

2. The mold of claim 1, wherein the single tongue forming portion is at least 10 centimeters (cm) in length.

3. The mold of claim 2, wherein the single tongue forming portion is less than or equal to 25 cm in length.

4. The mold of claim 1, wherein the single tongue forming portion is less than or equal to 5 mm thick.

5. The mold of claim 1, wherein the single tongue forming portion has a width of at least half a width of the tread.

6. The mold of claim 1, wherein the portion at the end of the single tongue forming portion is at least 5 mm thick.

* * * * *